United States Patent
Nagayama et al.

(10) Patent No.: US 8,145,067 B2
(45) Date of Patent: Mar. 27, 2012

(54) OPTICAL TRANSMITTER

(75) Inventors: Akira Nagayama, Kawasaki (JP); Kazuyoshi Shimizu, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 385 days.

(21) Appl. No.: 12/585,120

(22) Filed: Sep. 3, 2009

(65) Prior Publication Data

US 2009/0324252 A1 Dec. 31, 2009

Related U.S. Application Data

(63) Continuation of application No. PCT/JP2007/055263, filed on Mar. 15, 2007.

(51) Int. Cl.
*H04B 10/04* (2006.01)

(52) U.S. Cl. ........ 398/195; 398/198; 398/183; 398/186; 359/237; 359/239; 359/245; 372/32; 372/34; 372/36; 372/38.02

(58) Field of Classification Search .......... 398/182, 398/183, 186, 188, 192, 193, 194, 195, 196, 398/197, 198, 199, 200, 201, 135, 136, 79, 398/81, 158, 159, 137, 138, 139, 25, 26, 398/27, 30, 31, 32, 33, 38; 359/237, 238, 359/239, 245, 248; 372/32, 34, 36, 38.02
See application file for complete search history.

(56) References Cited

U.S. PATENT DOCUMENTS

| | | | |
|---|---|---|---|
| 5,900,621 A | 5/1999 | Nagakubo et al. | |
| 6,583,910 B1 * | 6/2003 | Satoh | 398/182 |
| 7,215,894 B2 * | 5/2007 | Kobayashi et al. | 398/195 |
| 2004/0028099 A1 | 2/2004 | Hongo et al. | |
| 2006/0088322 A1 | 4/2006 | Kobayashi et al. | |

FOREIGN PATENT DOCUMENTS

| | | |
|---|---|---|
| JP | 10-123471 | 5/1998 |
| JP | 11-305175 | 11/1999 |
| JP | 2000-036794 | 2/2000 |
| JP | 2002-049014 | 2/2002 |
| JP | 3333133 | 7/2002 |
| JP | 2004-61556 | 2/2004 |
| JP | 2006-121368 | 5/2006 |

OTHER PUBLICATIONS

International Search Report for PCT/JP2007/055263, mailed Mar. 15, 2007.
Japanese Office Action issued Feb. 15, 2011 in corresponding Japanese Patent Application 2009-503862.

* cited by examiner

*Primary Examiner* — Hanh Phan
(74) *Attorney, Agent, or Firm* — Staas & Halsey LLP

(57) ABSTRACT

An optical transmitter includes a light source that outputs light superposed with a pilot signal having a predetermined frequency; an optical modulating unit that modulates the light from the light source according to an input electric signal; a detecting unit that detects a high-output-side maximum value of signal light output from the optical modulating unit, a fluctuation width of the high-output-side maximum value, and a fluctuation width of a low-output-side minimum value; a bias-potential adjusting unit that adjusts a bias potential of an electric signal to be input to the optical modulating unit based on the detected maximum value; and an amplitude adjusting unit that adjusts an amplitude of the electric signal to be input to the optical modulating unit based on the fluctuation width of the high-output-side maximum value and the fluctuation width of the low-output-side minimum value.

10 Claims, 9 Drawing Sheets

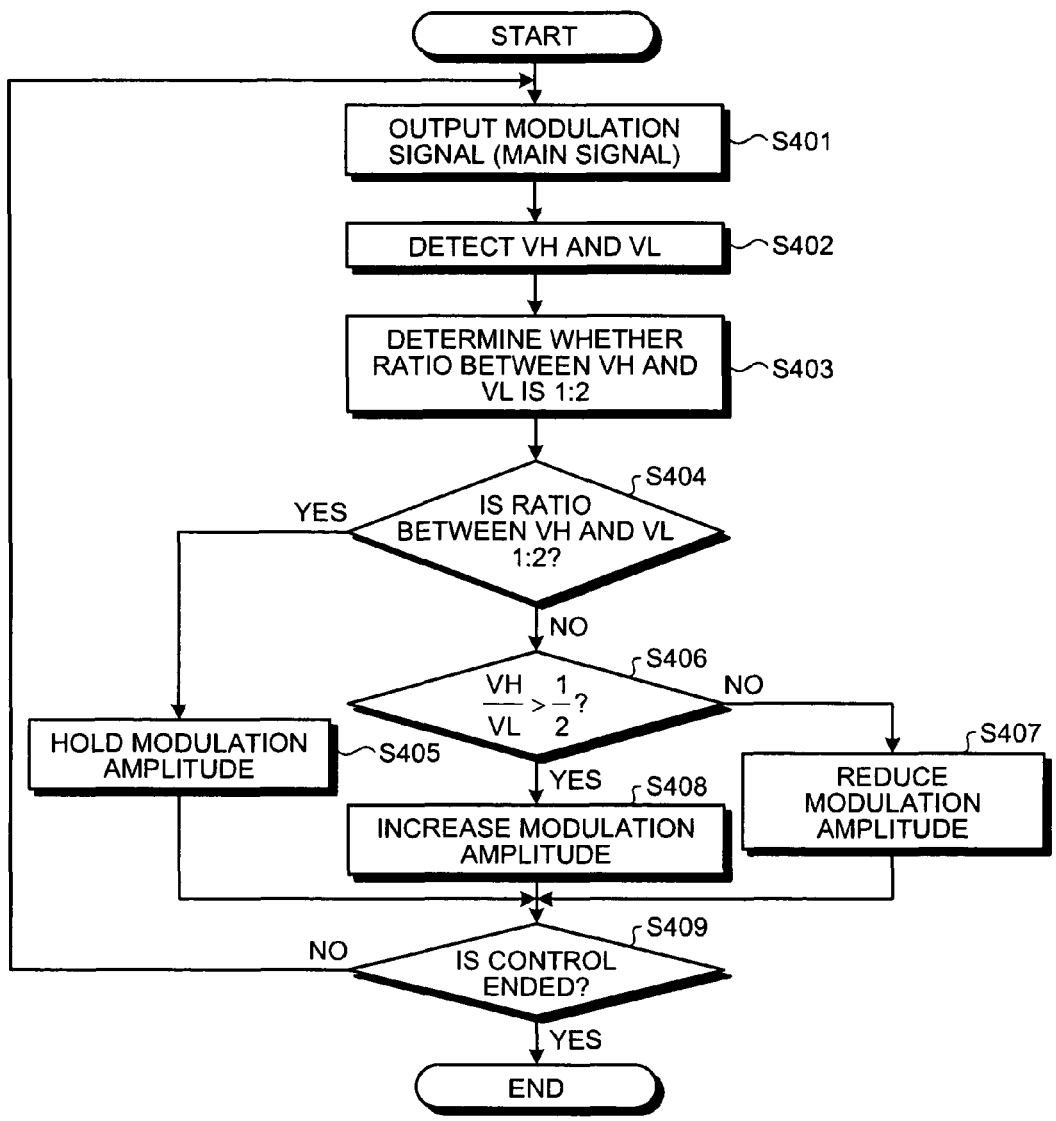

OPTICAL TRANSMITTER

CROSS-REFERENCE TO RELATED APPLICATION(S)

This application is a continuation of PCT international application Ser. No. PCT/JP2007/055263 filed on Mar. 15, 2007 which designates the United States, incorporated herein by reference, the entire contents of which are incorporated herein by reference.

FIELD

The embodiments discussed herein are directed to an optical transmitter that transmits signal light modulated according to an input electric signal.

BACKGROUND

Recently, along with an increase in amount of data transferred on a network, communication networks are demanded to have a transfer capacity equal to or more than 10 gigabits per second (10 G (b/s)). To achieve such a large capacity transfer, an electro absorption (EA) modulator or the like capable of modulating light at high speed have been used.

However, in the EA modulator, a characteristic of the magnitude of voltage applied to the EA modulator and the intensity of signal light output from the EA modulator (hereinafter, "extinction characteristic") is fluctuated depending on a temperature, and thus there is a necessity of maintaining the temperature constant to suppress fluctuation of the extinction characteristic. In addition, there is also a problem that the extinction characteristic is fluctuated due to degradation of the EA modulator with age or the like, and thus the waveform of the signal light output from the EA modulator is degraded.

Accordingly, there has been proposed a method in which a low frequency pilot signal is superposed on a main signal (transfer signal) to input it to an EA modulator, a pilot signal component is extracted from signal light output from the EA modulator, and based on the extracted pilot signal, voltage to be applied to the EA modulator is controlled, thereby suppressing the degradation of the waveform of the signal light due to fluctuation of the extinction characteristic (for example, see Japanese Laid-open Patent Publication No. 10-123471 and Japanese Patent No. 3333133).

However, generally, an operating point of a signal source circuit of a main signal and that of an EA modulator (bias voltage) do not always match (or it is difficult to match these points). Therefore, AC coupling is often adopted between the signal source of the main signal and the EA modulator.

When the signal source of the main signal and the EA modulator are AC-coupled, a low-range cutoff frequency is limited by a coupling condenser. Thus, when the conventional method in which the pilot signal is superposed on the main signal is used, it is necessary to lower the low-range cutoff frequency by using a large capacity condenser in order to flow not only the main signal but also the pilot signal without causing a distortion.

When the capacity of the condenser is increased to lower the low-range cutoff frequency, the size of the condenser becomes large, and consequently the size of an electrode are made larger. This makes it difficult to design a characteristic impedance of a substrate pattern. Further, as to the condenser, its impedance at a high frequency becomes higher as the size increases, and thus it is disadvantageous for the high frequency characteristic.

Accordingly, it has been a very important issue to suppress fluctuation of a waveform of signal light output from an EA modulator without using a large capacity condenser even when an extinction characteristic of the EA modulator is fluctuated.

SUMMARY

According to an aspect of the invention, an optical transmitter includes a light source that outputs light superposed with a pilot signal having a predetermined frequency; an optical modulating unit that modulates the light from the light source according to an electric signal input thereto; a detecting unit that detects a high-output-side maximum value of signal light output from the optical modulating unit, a fluctuation width of the high-output-side maximum value, and a fluctuation width of a low-output-side minimum value; a bias-potential adjusting unit that adjusts a bias potential of an electric signal to be input to the optical modulating unit based on the detected maximum value; and an amplitude adjusting unit that adjusts an amplitude of the electric signal to be input to the optical modulating unit based on the fluctuation width of the high-output-side maximum value and the fluctuation width of the low-output-side minimum value.

According to another aspect of an embodiment, an optical transmitter includes a light source that outputs light superposed with a pilot signal having a predetermined frequency; an optical modulating unit that modulates the light from the light source according to an electric signal input thereto; a detecting unit that detects a high-voltage-side maximum value of the electric signal input to the optical modulating unit, a fluctuation width of the high-voltage-side maximum value, and a fluctuation width of a low-voltage-side minimum value; a bias-potential adjusting unit that adjusts a bias potential of the electric signal to be input to the optical modulating unit based on the high-voltage-side maximum value and a value of a current input to the optical modulating unit; and an amplitude adjusting unit that adjusts an amplitude of the electric signal to be input to the optical modulating unit based on the fluctuation width of the high-voltage-side maximum value and the fluctuation width of the low-voltage-side minimum value.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 9 is a flowchart of a process procedure relating to modulation amplitude control of the second embodiment.

DESCRIPTION OF EMBODIMENTS

Preferred embodiments of an optical transmitter according to the present invention will be explained below in detail with reference to the accompanying drawings.

[a] First Embodiment

An outline and features of an optical transmitter according to a first embodiment of the present invention are described first. The optical transmitter superposes a low frequency pilot signal on light output from a light source unit and includes an optical modulator (for example, an EA modulator) that modulates signal light superposed with the pilot signal according to an input modulation signal (electric signal). The optical transmitter detects a high-output-side maximum value of the signal light output from the optical modulator, a fluctuation width of a high-output-side maximum value, and a fluctuation width of a low-output-side minimum value. Based on the high-output-side maximum value, the optical transmitter 100 adjusts a bias potential of the electric signal to be input to the optical modulator, and based on the fluctuation width of the high-output-side maximum value and the fluctuation width of the low-output-side minimum value, the optical transmitter 100 adjusts the amplitude of the electric signal to be input to the optical modulator.

As described above, the optical transmitter according to the first embodiment adjusts the bias voltage and amplitude of the electric signal to be input to the optical modulator, based on the high-output-side maximum value of the signal light output from the optical modulator, the fluctuation width of the high-output-side maximum value, and the fluctuation width of the low-output-side minimum value. Thus, even when the extinction characteristic of the optical modulator is fluctuated, it is possible to optimally adjust the bias point and the fluctuating amplitude, thereby suppressing fluctuation of the waveform of the signal light.

Figure 1:
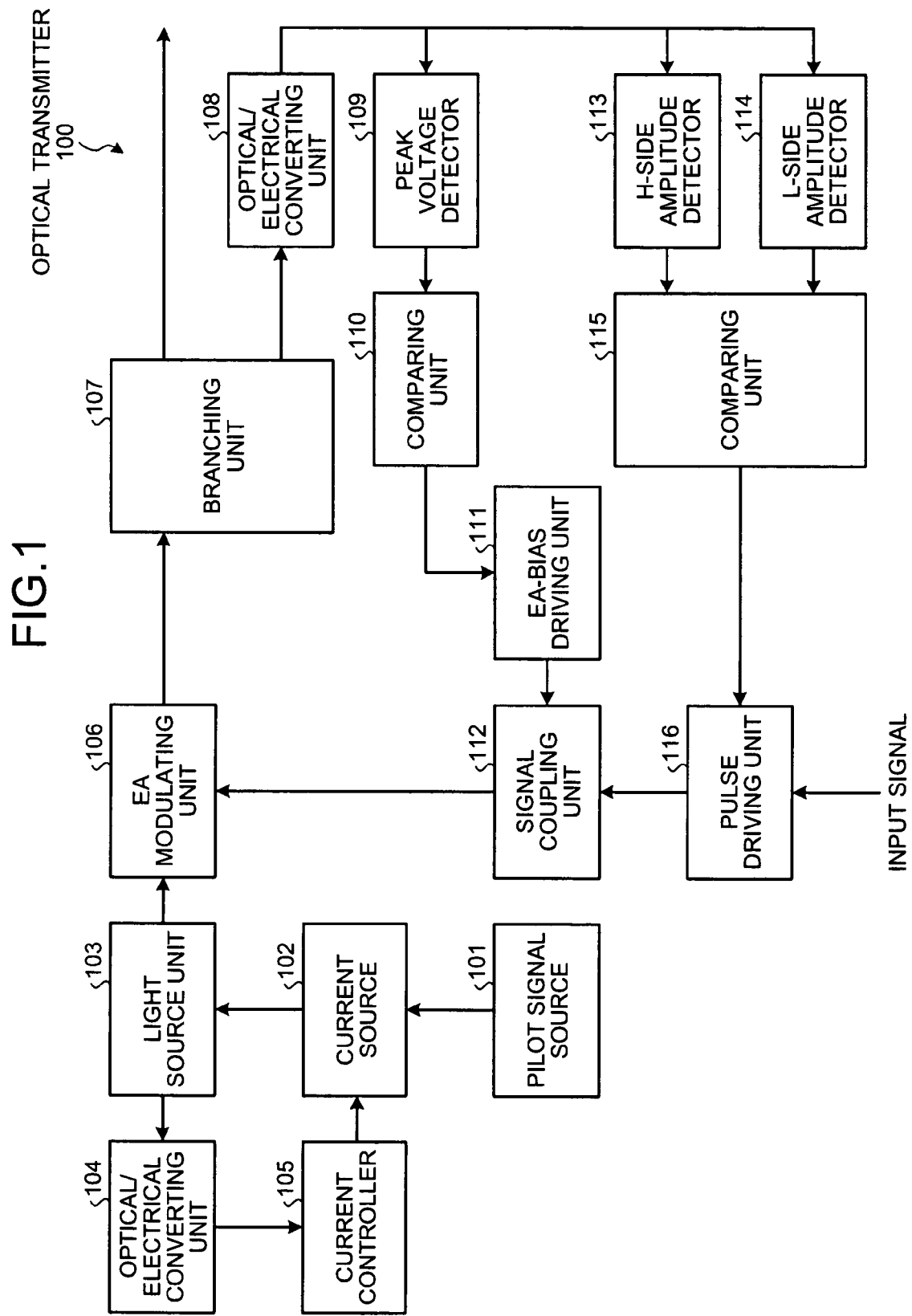
FIG. 1 is a functional block diagram of a configuration of an optical transmitter according to a first embodiment of the present invention.

A configuration of the optical transmitter according to the first embodiment is described next. FIG. 1 is a functional block diagram of the configuration of the optical transmitter according to the first embodiment. As depicted in FIG. 1, an optical transmitter 100 includes a pilot signal source 101, a current source 102, a light source unit 103, optical/electrical converting units 104 and 108, a current controller 105, an EA modulating unit 106, a branching unit 107, a peak voltage detector 109, comparing units 110 and 115, an EA-bias driving unit 111, a signal coupling unit 112, an H-side amplitude detector 113, an L-side amplitude detector 114, and a pulse driving unit 116.

The pilot signal source 101 outputs a pilot signal having a predetermined frequency (low frequency signal) to the current source 102. The current source 102 outputs an electric signal superposed with the pilot signal output from the pilot signal source 101, to the light source unit 103.

The light source unit 103 produces signal light based on the electric signal output from the current source 102 and outputs the produced signal light to the optical/electrical converting unit 104 and the EA modulating unit 106. The light source unit 103 uses the electric signal superposed with the pilot signal from the current source 102 to produce signal light superposed with the pilot signal.

The optical/electrical converting unit 104 converts the signal light output from the light source unit 103 into an electric signal. The optical/electrical converting unit 104 outputs the converted electric signal to the current controller 105. The current controller 105 acquires the electric signal that is proportional to a light output, from the optical/electrical converting unit 104, and controls a current of the current source 102 so that the amplitude (or a maximum output (maximum value)) of the electric signal is adjusted to a predetermined reference value. The current controller 105 controls the current of the current source 102, and thus the signal light output from the light source unit 103 is maintained constant.

The EA modulating unit 106 modulates the signal light (signal light superposed with the pilot signal) output from the light source unit 103, according to the electric signal input from the signal coupling unit 112, and outputs the modulated signal light to the branching unit 107. In the EA modulating unit 106, light transmission is changed according to the electric signal output from the signal coupling unit 112.

When the low frequency pilot signal is superposed on the light of the light source, a change in phase with the pilot signal occurs in a photocurrent of the EA modulating unit 106, and also, the change in photocurrent brings about a change in opposite phase with the pilot signal in a current flowing through a termination resistance connected in parallel to the EA modulating unit 106. Thus, in the EA bias, a change in opposite phase with the pilot signal occurs. In a state that the modulation signal is input to the EA modulating unit 106, the pilot signal is to be superposed in an envelop shape on a high output side and a low output side of the modulation signal. As a result, the pilot signal is superposed in an envelope shape both on the H side and the L side of the signal light output from the EA modulating unit 106.

Figure 2:
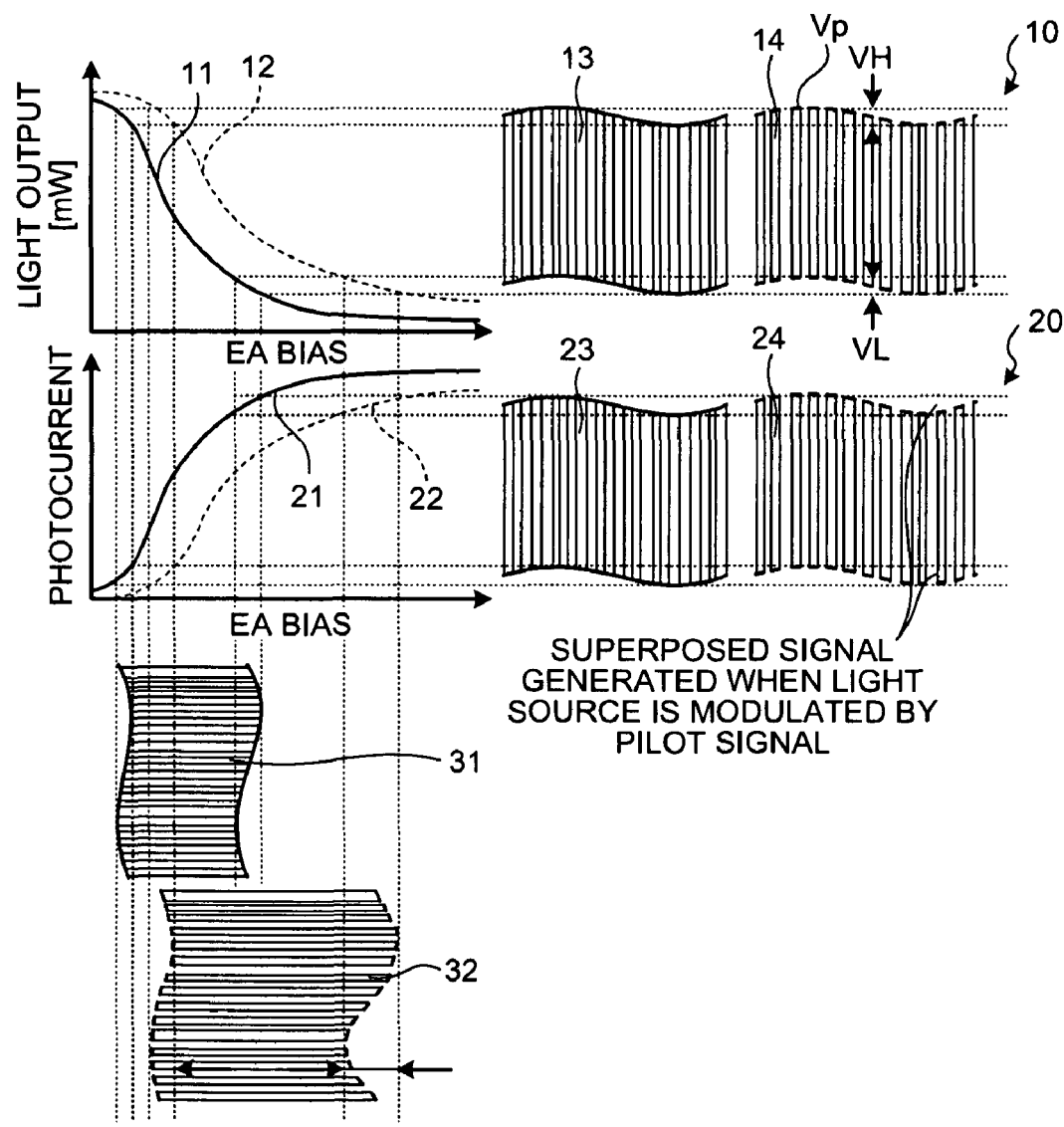
FIG. 2 depicts a relation between signal light output from an EA modulator according to the first embodiment and an electric signal (modulation signal) applied to the EA modulator.

A relation between the signal light output from the EA modulating unit 106 and the electric signal (modulation signal) applied to the EA modulating unit 106 is described next. FIG. 2 depicts the relation between the signal light output from the EA modulator according to the first embodiment and the electric signal (modulation signal) applied to the EA modulator. FIG. 2 includes a graph 10 and a graph 20.

In the graph 10, a horizontal axis represents voltage (EA bias) input to the EA modulating unit 106 and a vertical axis represents power of the signal light output from the EA modulating unit 106. A curve 11 and a curve 12 indicate the extinction characteristic of the EA modulating unit 106. The extinction characteristic of the EA modulating unit 106 changes according to a temperature. In this case, however, as one example, only two types of extinction characteristics are depicted.

When the EA modulating unit 106 having an extinction characteristic as depicted in the curve 11 in the graph 10 receives a modulation signal 31 (electric signal output from the signal coupling unit 112 to the EA modulating unit 106), signal light 13 is output from the EA modulating unit 106. In the modulation signal 31, the modulation amplitude and the EA bias of the modulation signal 31 have been set optimally to match the extinction characteristic depicted in the curve 11.

Similarly, when the EA modulating unit 106 having an extinction characteristic as depicted in the curve 12 in the graph 10 receives a modulation signal 32 (electric signal output from the signal coupling unit 112 to the EA modulating unit 106), signal light 14 is output from the EA modulating unit 106. In the modulation signal 32, the modulation amplitude and the EA bias of the modulation signal 32 have been set optimally to match the extinction characteristic depicted in the curve 12.

In the first embodiment, as one example, VH denotes the fluctuation width of the amplitude on the high output side (hereinafter, "H side") of the waveform of the signal light 14, and VL denotes the fluctuation width of the amplitude on the low output side (hereinafter, "L side") of the waveform of the signal light 14. The maximum output of the amplitude on the H side of the signal light 14 is a peak voltage (hereinafter, "peak voltage Vp").

Moving to explanation of the graph 20, in the graph 20, a horizontal axis represents voltage input to the EA modulating unit 106 (EA bias) and a vertical axis indicates a magnitude of a photocurrent of the EA modulating unit 106. The photocurrent indicates a current absorbed to the EA modulating unit 106 (absorbed current). A curve 21 indicates a photocurrent characteristic when the extinction characteristic is represented by the curve 11. A curve 22 indicates a photocurrent characteristic when the extinction characteristic is represented by the curve 12.

When the photocurrent characteristic corresponds to the curve 21, if the modulation signal 31 is input to the EA modulating unit 106, a photocurrent waveform 23 is output. When the photocurrent characteristic corresponds to the curve 22, if the modulation signal 32 is input to the EA modulating unit 106, a photocurrent waveform 24 is output.

Referring back to FIG. 1, the branching unit 107 branches the signal light input from the EA modulating unit 106 into a plurality of portions at a predetermined proportion and outputs the resultant light. For example, by the branching unit 107, the signal light is branched into 9:1. Signal light having a large branching proportion is output to a transfer path as the signal light of the optical transmitter 100. Signal light with a small branching proportion, which is branched by the branching unit 107, is output to the optical/electrical converting unit 108. The optical/electrical converting unit 108 converts the signal light input from the branching unit 107 into an electric signal, and outputs the electric signal to the peak voltage detector 109, the H-side amplitude detector 113, and the L-side amplitude detector 114.

The peak voltage detector 109 detects the high-output-side maximum output of the signal light input from the optical/electrical converting unit 108. Specifically, the peak voltage detector 109 detects the peak voltage Vp, which is the peak voltage on the H side, from the waveform of the electric signal input from the optical/electrical converting unit 108. The peak voltage detector 109 outputs the detected peak voltage Vp to the comparing unit 110.

The comparing unit 110 compares the peak voltage Vp input from the peak voltage detector 109 and a predetermined reference value, and adjusts a voltage (bias) that the EA-bias driving unit 111 applies to the EA modulating unit 106 according to the comparing result. The comparing unit 110 holds the bias point of the EA-bias driving unit 111 when the reference value and the peak voltage Vp are equal. On the other hand, the comparing unit 110 raises the bias point when the peak voltage Vp is smaller than the reference value and lowers the bias point when the peak voltage Vp is larger than the reference value.

The EA-bias driving unit 111 outputs the bias signal in which the bias point is adjusted by the comparing unit 110, to the signal coupling unit 112. The signal coupling unit 112 couples the bias signal input from the EA-bias driving unit 111 and the modulation signal output from the pulse driving unit 116, and outputs the coupled signal as an electric signal (modulation signal) to the EA modulating unit 106.

The H-side amplitude detector 113 detects a fluctuation width of the high-output-side maximum output of the output of the signal light input from the optical/electrical converting unit 108. Specifically, the H-side amplitude detector 113 detects VH, which is a fluctuation width of the amplitude on the H side, from the waveform of the electric signal input from the optical/electrical converting unit 108. The H-side amplitude detector 113 outputs the detected VH to the comparing unit 115.

The L-side amplitude detector 114 detects a fluctuation width of the low-output-side minimum output (minimum value) of the output of the signal light input from the optical/electrical converting unit 108. Specifically, the L-side amplitude detector 114 detects VL, which is a fluctuation width of the amplitude on the L side, from the waveform of the electric signal input from the optical/electrical converting unit 108. The L-side amplitude detector 114 outputs the detected VL to the comparing unit 115.

The comparing unit 115 compares VH input from the H-side amplitude detector 113 and VL input from the L-side amplitude detector 114, and adjusts a modulation amplitude of the modulation signal to be output from the pulse driving unit 116 according to the comparing result. The comparing unit 115 adjusts the modulation amplitude so that a ratio between VH and VL becomes a predetermined value (in the first embodiment, VH:VL=1:1).

When VH is smaller than VL, this is a state that the modulation amplitude is insufficient, and thus the comparing unit 115 increases the modulation amplitude of the modulation signal to be output from the pulse driving unit 116. On the other hand, when VH is larger than VL, the modulation amplitude is too large. Thus, the comparing unit 115 reduces the modulation amplitude of the modulation signal to be output from the pulse driving unit 116. In this way, when the comparing unit 115 adjusts the ratio between VH and VL to 1:1, it becomes possible to prevent the modulation amplitude from becoming excessive or insufficient.

When an input signal is input from an external terminal device, the pulse driving unit 116 converts the input signal into an electric signal (modulation signal) and outputs the electric signal to the signal coupling unit 112. The modulation amplitude of the modulation signal to be output from the pulse driving unit 116 is a modulation amplitude adjusted by the comparing unit 115.

Figure 3:
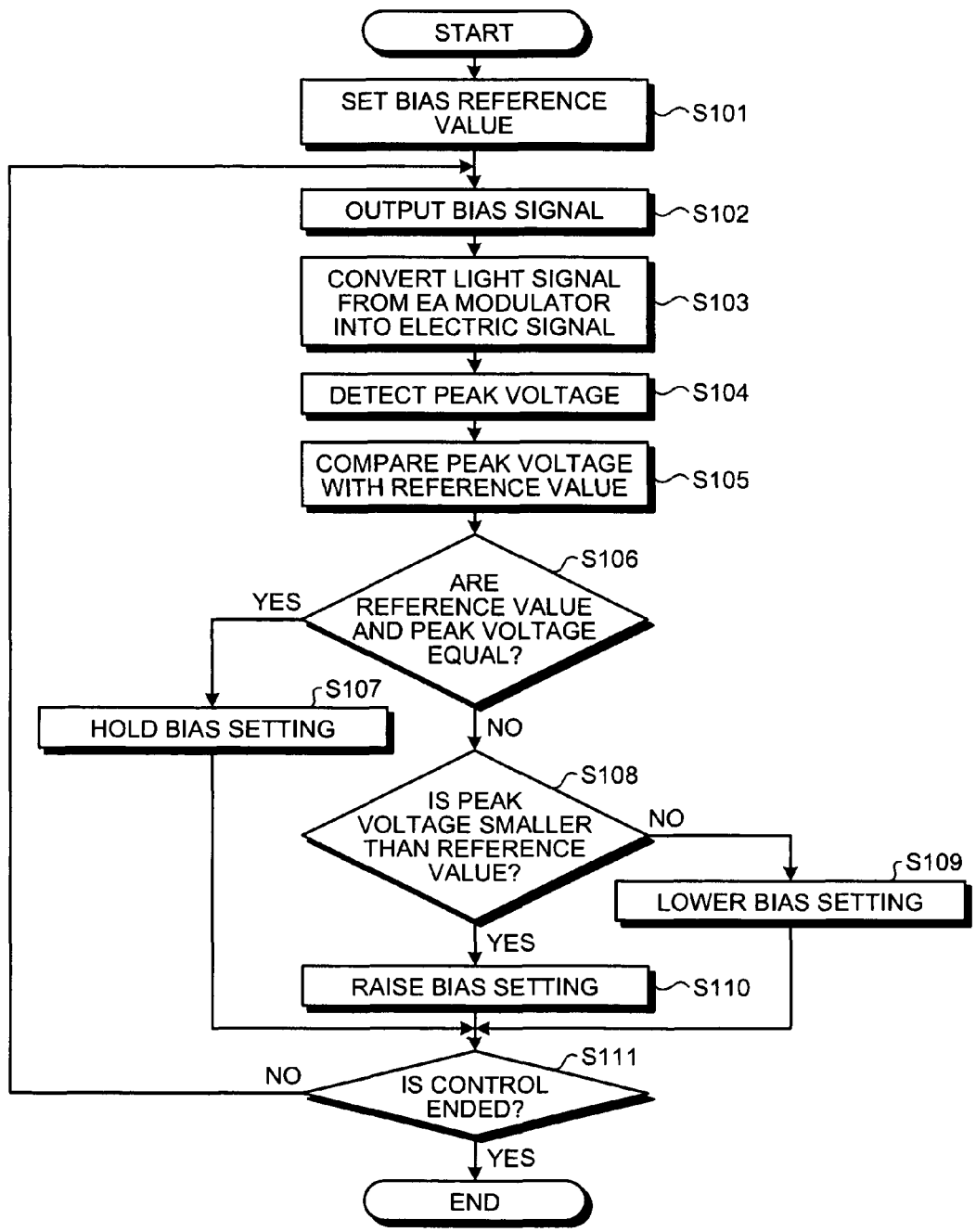
FIG. 3 is a flowchart of a process procedure relating to bias control of the first embodiment.

Next, a process procedure relating to bias control of the optical transmitter 100 is described next. FIG. 3 is a flowchart of the process procedure relating to the bias control of the first embodiment. As depicted in FIG. 3, a bias reference value is set (Step S101), and the EA-bias driving unit 111 outputs a bias signal (Step S102).

Then, the optical/electrical converting unit 108 converts the signal light from the EA modulator into the electric signal, and outputs the electric signal to the peak voltage detector 109 (Step S103). The peak voltage detector 109 detects the peak voltage Vp (Step S104), and the comparing unit 110 compares the reference value with the peak voltage Vp (Step S105).

When the reference value and the peak voltage Vp are equal (YES at Step S106), setting of the bias is held (Step S107), and the process proceeds to Step S111. On the other hand, when the reference value and the peak voltage Vp are different (NO at Step S106), it is determined whether the peak voltage Vp is smaller than the reference value. When the peak voltage Vp is larger than the reference value (NO at Step S108), the setting of the bias is lowered (Step S109), and then the process proceeds to Step S111.

When the peak voltage Vp is smaller than the reference value (YES at Step S108), the setting of the bias is raised (Step S110) and it is determined whether to end the control. When the control is not ended (NO at Step S111), the process proceeds to Step S102. When the control is ended (YES at Step S111), the bias control is ended.

In this way, when the bias is adjusted based on the peak voltage Vp and the reference value, the peak of the signal light can be maintained constant irrespective of fluctuation of the extinction characteristic of the signal light output from the EA modulating unit 106.

Figure 4:
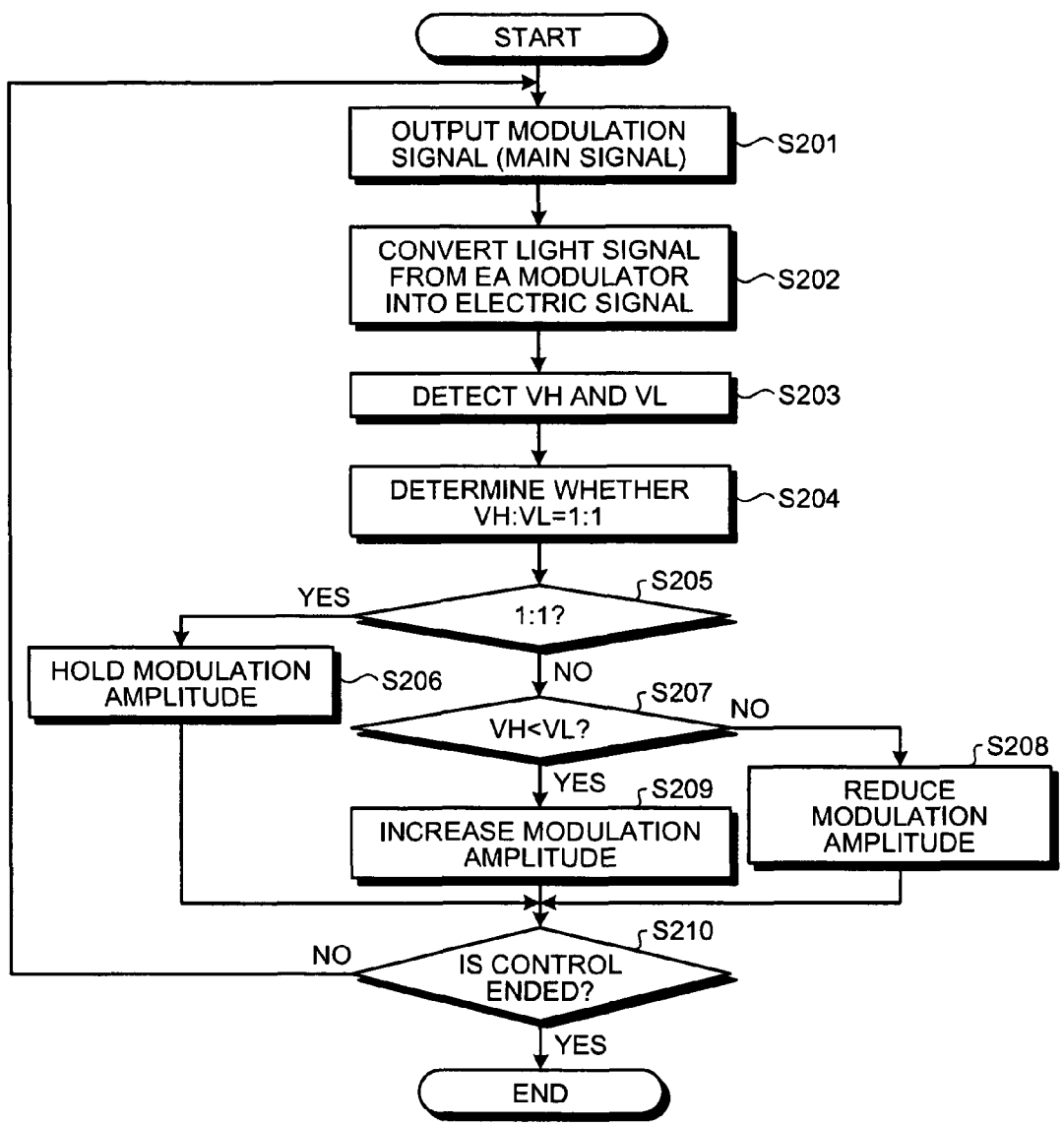
FIG. 4 is a flowchart of a process procedure relating to modulation amplitude control of the first embodiment.

Next, a process procedure relating to modulation amplitude control of the optical transmitter 100 is described next. FIG. 4 is a flowchart of the process procedure relating to the modulation amplitude control of the first embodiment. As depicted in FIG. 4, the pulse driving unit 116 outputs the modulation signal to the EA modulating unit 106 (Step S201), and the optical/electrical converting unit 108 converts the signal light from the EA modulating unit 106 into the electric signal and outputs the converted electric signal to the H-side amplitude detector 113 and the L-side amplitude detector 114 (Step S202).

The H-side amplitude detector 113 and the L-side amplitude detector 114 detect VH and VL, respectively (Step S203), and the comparing unit 110 determines whether VH:VL=1:1 is established (Step S204). When VH:VL=1:1 is established (YES at Step S205), the modulation amplitude is held (Step S206), and the process proceeds to Step S210.

On the other hand, when VH:VL=1:1 is not established (NO at Step S205), the comparing unit 110 determines whether VH is smaller than VL. When VH is larger than VL (NO at Step S207), the modulation amplitude is reduced (Step S208), and the process proceeds to Step S210.

When VH is larger than VL (YES at Step S207), the comparing unit 110 increases the modulation amplitude (Step S209). Thereafter, whether to end the control is determined. When the control is not ended (NO at Step S210), the process proceeds to Step S201. When the control is ended (YES at Step S210), the modulation amplitude control is ended.

As described above, when the ratio between VH and VL is controlled constant, it becomes possible to prevent the modulation amplitude of the modulation signal from becoming excessive or insufficient.

As described above, the optical transmitter 100 superposes the low frequency pilot signal onto the light output from the light source unit 103 and includes the EA modulating unit 106 that modulates the signal light superposed with the pilot signal according to the input modulation signal. The optical transmitter 100 detects the high-output-side maximum value (Vp) of the signal light output from the EA modulating unit 106, the fluctuation width of the high-output-side maximum value (VH), and the fluctuation width of the low-output-side minimum value (VL). Based on the high-output-side maximum value (Vp), the optical transmitter 100 adjusts the bias potential of the electric signal to be applied to the optical modulator, and based on the fluctuation width of the high-output-side maximum value (VH) and the fluctuation width of the low-output-side minimum value (VL), adjusts the amplitude of the modulation signal to be input to the EA modulating unit 106. Thus, even when the extinction characteristic of the EA modulating unit 106 is fluctuated, it is possible to optimally adjust the bias point and the fluctuating amplitude, thereby suppressing fluctuation of the waveform of the signal light.

[b] Second Embodiment

An outline and features of an optical transmitter according to a second embodiment of the present invention are described next. The optical transmitter according to the second embodiment superposes a low frequency pilot signal on light output from a light source unit, and includes an EA modulator that modulates signal light superposed with the pilot signal according to an input modulation signal. The optical transmitter 200 detects a high-voltage-side maximum value of the modulation signal input to the EA modulator, a fluctuation width of the high-voltage-side maximum value, and a fluctuation width of a low-voltage-side minimum value. Based on the high-voltage-side maximum value and the value of a current input to the EA modulator, the optical transmitter 200 adjusts a bias potential to be input to the EA modulator, and also, based on the fluctuation width of the high-voltage-side maximum value and the fluctuation width of the low-voltage-side minimum value, the optical transmitter 200 adjusts the amplitude of the modulation signal to be input to the EA modulator.

As described above, based on the high-voltage-side maximum value and the value of a current input to the EA modulator, the optical transmitter according to the second embodiment adjusts the bias potential input to the EA modulator, and also, based on the fluctuation width of the high-voltage-side maximum value and the fluctuation width of the low-voltage-side minimum value, the optical transmitter 200 adjusts the amplitude of the modulation signal to be input to the EA modulator. Therefore, even when the extinction characteristic of the optical modulator is fluctuated, it is possible to optimally adjust the bias point and the fluctuating amplitude, thereby suppressing fluctuation of the waveform of the signal light.

Figure 5:
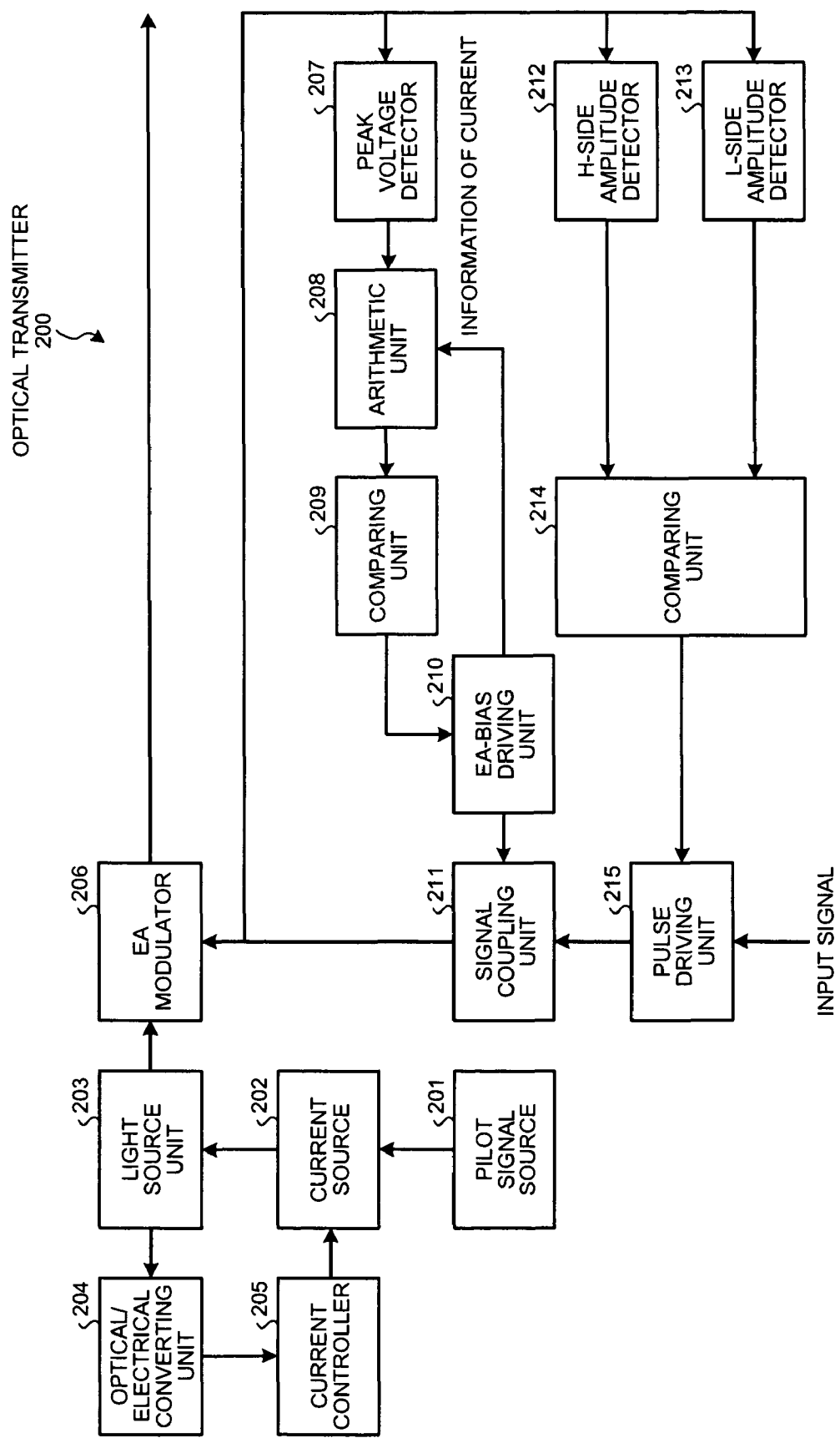
FIG. 5 is a functional block diagram of a configuration of an optical transmitter according to a second embodiment of the present invention.

A configuration of the optical transmitter according to the second embodiment is described next. FIG. 5 is a functional block diagram of the configuration of the optical transmitter according to the second embodiment. As depicted in FIG. 5, an optical transmitter 200 includes a pilot signal source 201, a current source 202, a light source unit 203, an optical/electrical converting unit 204, a current controller 205, an EA modulator 206, a peak voltage detector 207, an arithmetic unit 208, a comparing unit 209, an EA-bias driving unit 210, a signal coupling unit 211, an H-side amplitude detector 212, an L-side amplitude detector 213, a comparing unit 214, and a pulse driving unit 215.

The pilot signal source 201 outputs a pilot signal having a predetermined frequency (low frequency signal) to the current source 202. The current source 202 outputs an electric signal superposed with the pilot signal output from the pilot signal source 201, to the light source unit 203.

The light source unit 203 produces signal light based on the electric signal output from the current source 202 and outputs the produced signal light to the optical/electrical converting unit 204 and the EA modulator 206. The light source unit 203 produces signal light superposed with the pilot signal, by the electric signal superposed with the pilot signal from the current source 202.

The optical/electrical converting unit 204 converts the signal light output from the light source unit 203 into an electric signal. The optical/electrical converting unit 204 outputs the converted electric signal to the current controller 205. The current controller 205 acquires the electric signal that is proportional to a light output, from the optical/electrical converting unit 204, and controls a current of the current source 202 so that the amplitude (or a maximum output) of the electric signal is adjusted to a predetermined reference value. The current controller 205 controls the current of the current source 202, and thus the signal light output from the light source unit 203 is maintained constant.

The EA modulator 206 performs modulation according to the electric signal (modulation signal) input from the signal coupling unit 211, on the signal light (signal light superposed with the pilot signal) output from the light source unit 203 and outputs the modulated signal light to an external device. In the EA modulator 206, light transmission is changed according to the electric signal output from the signal coupling unit 211.

Figure 6:
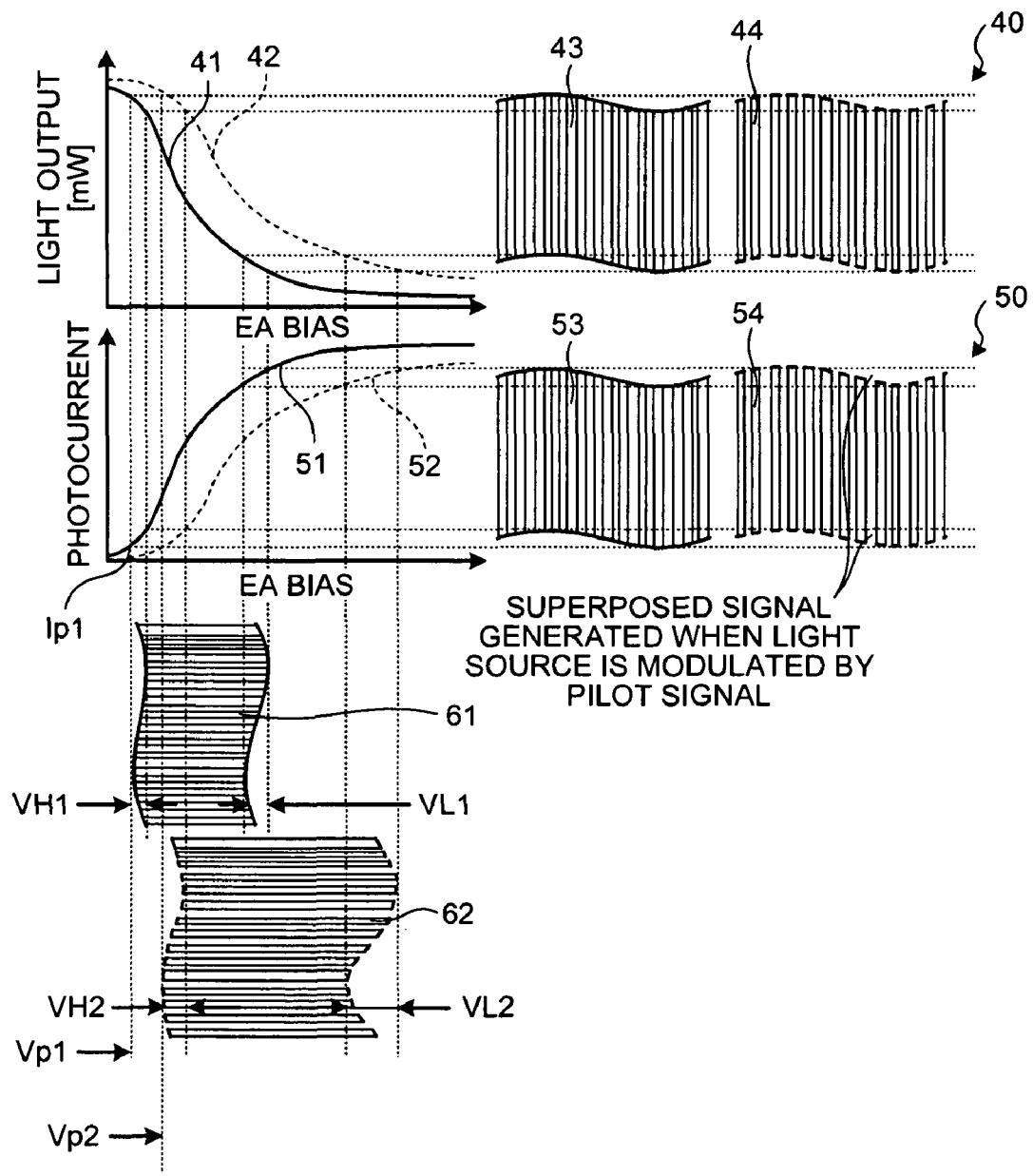
FIG. 6 depicts a relation between signal light output from an EA modulator according to the second embodiment and an electric signal (modulation signal) input to the EA modulator.

A relation between the signal light output from the EA modulator 206 and the electric signal (modulation signal) input to the EA modulator 206 is described below. FIG. 6 depicts the relation between the signal light output from the EA modulator according to the second embodiment and the electric signal (modulation signal) input to the EA modulator. FIG. 6 includes a graph 40 and a graph 50.

In the graph 40, a horizontal axis represents voltage (EA bias) input to the EA modulator 206, and a vertical axis represents power of the signal light output from the EA modulating unit 106. A curve 41 and a curve 42 indicate an extinction characteristic of the EA modulator 206. The extinction characteristic of the EA modulator 206 changes according to a temperature. In this case, however, as one example, only two types of extinction characteristics are depicted.

When the EA modulator 206 having an extinction characteristic as depicted in the curve 41 in the graph 40 receives a modulation signal 61 (electric signal output from the signal coupling unit 211 to the EA modulator 206), signal light 43 is output from the EA modulator 206.

A peak voltage Vp1 denotes the high-voltage-side maximum value of the modulation signal 61, VH1 denotes the fluctuation width of the high-voltage-side (hereinafter, "H side") maximum value of the modulation signal 61, and VL1 denotes the fluctuation width of the low-voltage-side (hereinafter, "L side") minimum value of the modulation signal 61.

When the EA modulator 206 having an extinction characteristic as depicted in the curve 42 in the graph 40 receives a modulation signal 62 (electric signal output from the signal coupling unit 211 to the EA modulator 206), signal light 44 is output from the EA modulator 206. A peak voltage Vp2 denotes the high-voltage-side maximum value of the modulation signal 62, VH2 denotes the fluctuation width of the H-side maximum value of the modulation signal 62, and VL2 denotes the fluctuation width of the L-side minimum value of the modulation signal 62.

Moving to explanation of the graph 50, in the graph 50, a horizontal axis represents voltage input to the EA modulator 206 (EA bias), and a vertical axis indicates a magnitude of a photocurrent of the EA modulator 206. A curve 51 indicates a photocurrent characteristic when the modulation signal 61 is input to the EA modulator 206 in which the extinction characteristic is represented by the curve 41. A curve 52 indicates a photocurrent characteristic when the modulation signal 62 is input to the EA modulator 206 in which the extinction characteristic is represented by the curve 42.

Further, when the photocurrent characteristic corresponds to the curve 51, if the modulation signal 61 is input to the EA modulator 206, a photocurrent waveform 53 is output. When the photocurrent characteristic corresponds to the curve 52, if the modulation signal 62 is input to the EA modulator 206, a photocurrent waveform 54 is output. Reference character Ip1 denotes an intersection between the curve 51 and the peak voltage Vp1, and Ip2 denotes an intersection between the curve 52 and the peak voltage Vp2.

As depicted in FIG. 6, the photocurrent and the EA bias of the EA modulator 206 are correlated with the extinction characteristic of the EA modulator 206. When the EA bias is increased, the photocurrent is also increased and the output of the signal light is reduced. On the other hand, when the EA bias is reduced, the photocurrent is also reduced and the output of the signal light is increased. When the output of the signal light from the light source unit 103 is constant, the relation between the photocurrent and the output of the signal light after flowing through the EA modulating unit 106 is in inverse proportion.

Therefore, even when the extinction characteristic of the EA modulator 206 is fluctuated, if the photocurrent is maintained constant, the output of the signal light that transmits the EA modulator 206 can be maintained constant. The photocurrent can be controlled by the EA bias, and thus when the EA bias is controlled so that the photocurrent is constant, the output of the signal light can be constant.

Referring back to FIG. 5, the peak voltage detector 207 acquires the modulation signal output from the signal coupling unit 211 and detects a peak voltage (Vp1 or Vp2) of the acquired modulation signal. The peak voltage detector 207 outputs information of the detected peak voltage to the arithmetic unit 208.

The arithmetic unit 208 performs an arithmetic operation on the photocurrent of the EA modulator 206. A specific equation by which the arithmetic unit 208 calculates the photocurrent is expressed by:

$$Ip = Ib - Vb/R \quad (1)$$

In the equation (1), Ip denotes the photocurrent of the EA modulator 206, Ib denotes a drive current of the EA bias, Vb denotes the EA bias, and R denotes a termination resistance of the EA modulator 206.

Figure 7:
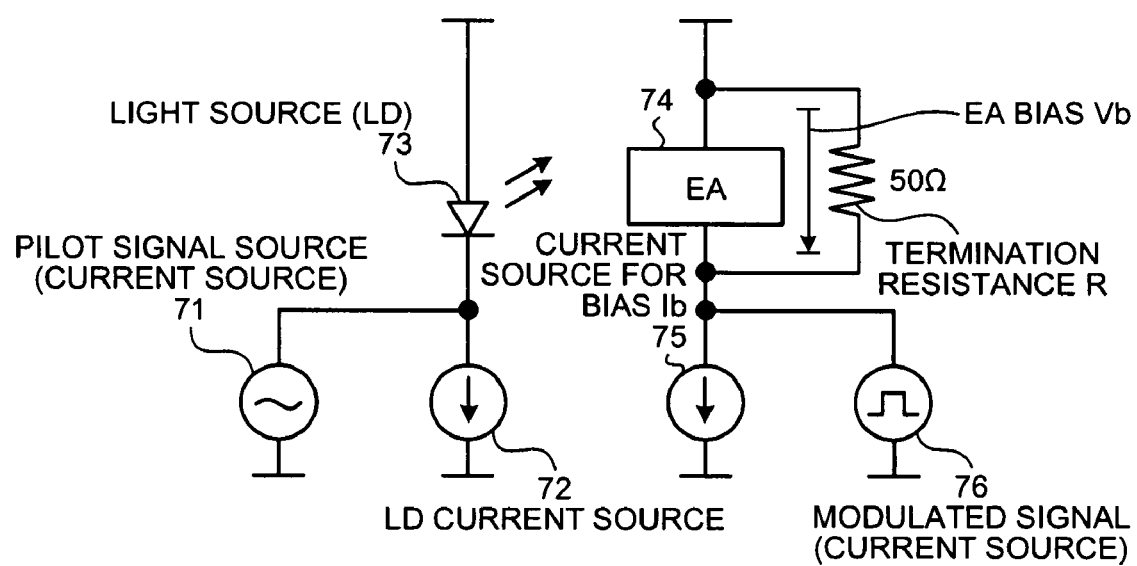
FIG. 7 is a schematic diagram for additionally explaining an equation (1)

FIG. 7 is a schematic diagram for additionally explaining the equation (1). A pilot signal source 71, an LD current source 72, a light source 73, an EA 74, a current source 75 for bias, and a pulse driving unit 76 depicted in FIG. 7 respectively correspond to the pilot signal source 201, the current source 202, the light source unit 203, the EA modulator 206, the EA-bias driving unit 210, and the pulse driving unit 215, which are depicted in FIG. 5.

As depicted in FIG. 7, the EA 74 is biased by voltage Vb (EA bias) generated as a result of the current Ib for bias flowing through the termination resistance R connected in parallel to the EA 74. The EA 74 absorbs light of the light source 73 and brings about a photocurrent Ip according to the EA bias vb. Thus, the current Ib for bias flows not only through the termination resistance R but also through the EA 74 by an amount of the photocurrent Ip. Accordingly, the photocurrent Ip can be evaluated by subtracting a current (value obtained by dividing the EA bias Vb by the resistance value R) flowing through the termination resistance R from the current Ib for bias.

Referring back to FIG. 5, the arithmetic unit 208 acquires information of the EA bias current Ib from the EA-bias driving unit 210, and acquires information of the EA bias Vb, as a peak voltage, from the peak voltage detector 207. Information of the termination resistance R is supposed to be previously stored in a storage unit of the arithmetic unit 208. The arithmetic unit 208 outputs the arithmetically operated photocurrent to the comparing unit 209.

The comparing unit 209 compares a predetermined reference value and the photocurrent input from the arithmetic unit 208 and adjusts the voltage (EA bias) that the EA-bias driving unit 210 applies to the EA modulator 206. The comparing unit 209 holds the bias point of the EA-bias driving unit 210 when the reference value and the photocurrent value are equal. On the other hand, when the photocurrent is smaller than the reference value, the bias point is lowered, and when the photocurrent is larger than the reference value, the bias point is raised.

The EA-bias driving unit 210 outputs the bias signal in which the bias point is adjusted by the comparing unit 209, to the signal coupling unit 211. The signal coupling unit 211 couples the bias signal input from the EA-bias driving unit 210 and the modulation signal output from the pulse driving unit 215, and outputs the coupled signal as an electric signal (modulation signal) to the EA modulator 206.

When the extinction characteristic of the EA modulator 206 corresponds to the curve 41 in FIG. 6, if the modulation signal 61 is input to the EA modulator 206, the peak voltage Vp1 is detected by the peak voltage detector 207. When a value of the peak voltage is substituted into Vb in the equation (1), a photocurrent Ip1 can be evaluated. It is so set that the photocurrent Ip1 is equal to the reference value (in FIG. 6, Ip1 is at an intersection between the Vp1 and the curve 51).

When the extinction characteristic of the EA modulator 206 is fluctuated from the curve 41 to the curve 42, the relation between the photocurrent and the EA bias is also changed from the curve 51 to the curve 52 as depicted in FIG. 6. With this change, the photocurrent equivalent to the peak voltage Vp1 of the modulation signal is reduced. In this case, if there is no change in the current Ib for EA bias, a current corresponding to a reduced amount of the photocurrent flows through the termination resistance R, and thus the EA bias Vb is increased.

As a result, the peak voltage of the modulation signal also is increased, and the photocurrent value is reduced more than the reference value (it is found from the equation (1) that a value of the photocurrent becomes small). To restore the reduced photocurrent to the reference value Ip1, it is necessary to control the EA bias with the EA bias current. When the photocurrent becomes equal to the reference value Ip1, the peak voltage of the modulation signal is Vp2 at which Ip1 and the photocurrent characteristic curve 52 intersect. In the example depicted in FIG. 6, with this control operation, the H side of the waveform of the signal light output from the EA modulator 206 is maintained constant.

The H-side amplitude detector 212 acquires the modulation signal output from the signal coupling unit 211 to detect the fluctuation width (VH1 or VH2) of the high-voltage-side maximum value of the modulation signal. Specifically, when the extinction characteristic of the EA modulator 206 corresponds to the curve 41, VH1, which is the fluctuation width of the amplitude on the H side, is detected. On the other hand, when the extinction characteristic of the EA modulator 206 corresponds to the curve 42, VH2, which is the fluctuation width of the amplitude on the H side, is detected. The H-side amplitude detector 212 outputs the detected fluctuation width of the amplitude on the H side, to the comparing unit 214.

The L-side amplitude detector 213 acquires the modulation signal output from the signal coupling unit 211 to detect the fluctuation width (VL1 or VL2) of the low-voltage-side minimum value of the modulation signal. Specifically, when the extinction characteristic of the EA modulator 206 corresponds to the curve 41, VL1, which is the fluctuation width of the L-side amplitude, is detected. On the other hand, when the extinction characteristic of the EA modulator 206 corresponds to the curve 42, VL2, which is the fluctuation width of the amplitude on the L side, is detected. The L-side amplitude detector 213 outputs the detected fluctuation width of the amplitude on the L side to the comparing unit 214.

The comparing unit 214 adjusts the modulation amplitude of the modulation signal output from the pulse driving unit 215, based on the H-side-amplitude fluctuation width VH (VH is VH1 or VH2) acquired from the H-side amplitude detector 212 and the L-side-amplitude fluctuation width VL (VL is VL1 or VL2) acquired from the L-side amplitude detector 213.

Specifically, the comparing unit 214 adjusts the modulation amplitude of the modulation signal so that VH:VL=1:2 is established. That is, the comparing unit 214 holds the modulation amplitude of the modulation signal output by the pulse driving unit 215 when VH/VL=1/2 is established. On the other hand, when the value of VL is reduced and VH/VL>1/2 is established, the modulation amplitude is increased because it is insufficient. On the other hand, when the value of VL is increased and VH/VL<1/2 is established, the modulation amplitude is reduced because it is too large.

When an input signal is input from an external terminal device, the pulse driving unit 215 converts the input signal into an electric signal (modulation signal) and outputs the electric signal to the signal coupling unit 211. The modulation amplitude of the modulation signal output by the pulse driving unit 215 is a modulation amplitude adjusted by the comparing unit 214.

Figure 8:
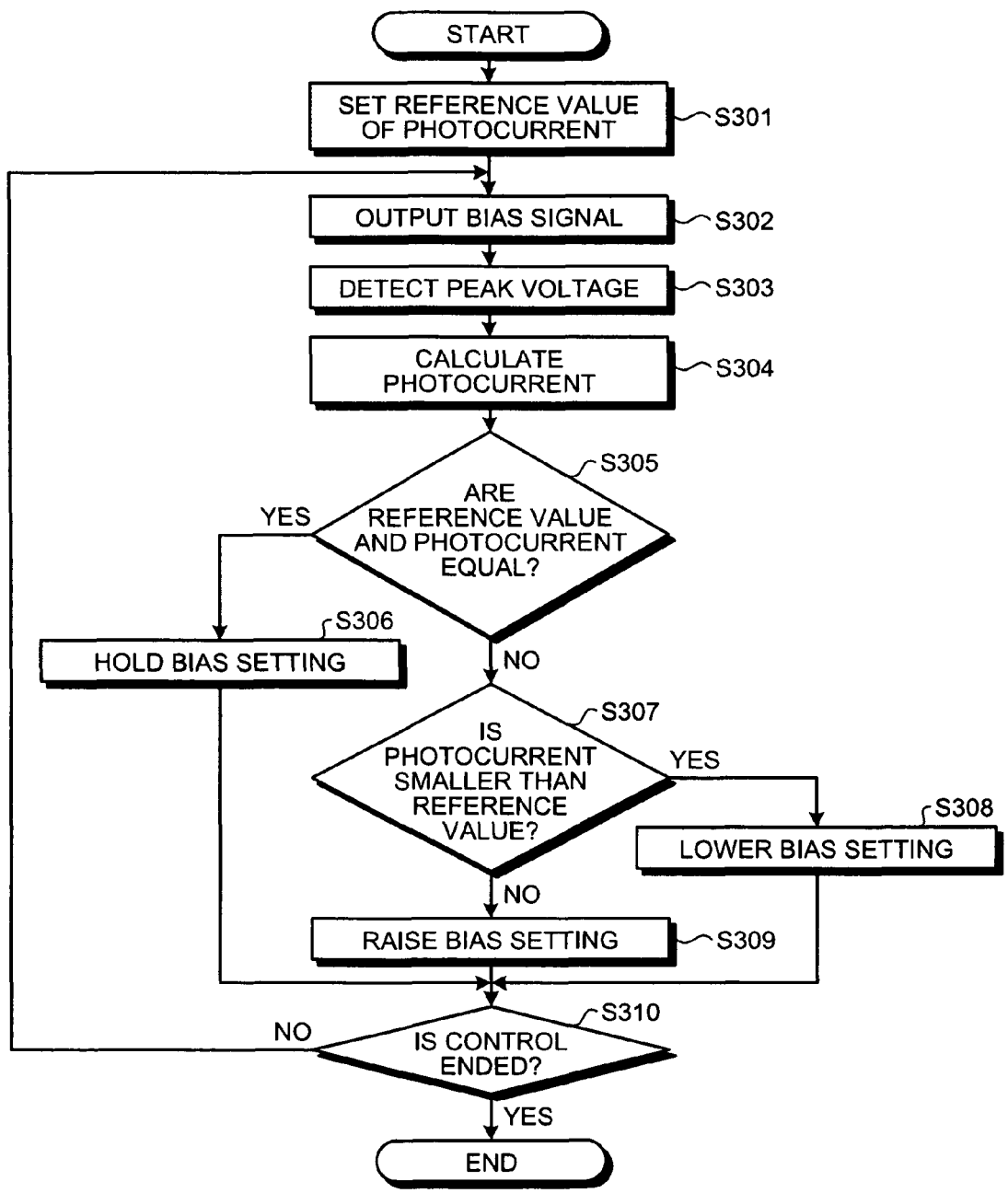
FIG. 8 is a flowchart of a process procedure relating to bias control of the second embodiment.

Next, a process procedure relating to bias control of the optical transmitter 200 is described next. FIG. 8 is a flowchart of the process procedure relating to the bias control of the second embodiment. As depicted in FIG. 8, a reference value of the photocurrent is set (Step S301), and the EA-bias driving unit 210 outputs the bias signal to the signal coupling unit 211 (Step S302).

The peak voltage detector 207 detects the peak voltage (Step S303), and the arithmetic unit 208 calculates the photocurrent (Step S304). The comparing unit 209 determines whether the reference value and the photocurrent are equal. When the reference value and the photocurrent are equal (YES at Step S305), the setting of the bias (current for bias) is held (Step S306), and the process proceeds to Step S310.

On the other hand, when the reference value and the photocurrent are different (NO at Step S305), the comparing unit 209 determines whether the photocurrent is smaller than the reference value. When the photocurrent is smaller than the reference value (YES at Step S307), the setting of the bias is lowered (Step S308), and the process proceeds to Step S310.

When the photocurrent is larger than the reference value (NO at Step S307), the setting of the bias is raised (Step S309), and it is determined whether to end the control. When the control is not performed (NO at Step S310), the process proceeds to Step S302. When the control is ended (YES at Step S310), the bias control is ended.

As described above, when the bias (current for bias) is adjusted based on the photocurrent and the reference value, the H-side output of the signal light output from the EA modulator 206 can be maintained constant.

A process procedure relating to modulation amplitude control of the optical transmitter 200 is described next. FIG. 9 is a flowchart of the process procedure relating to the modulation amplitude control of the second embodiment. As depicted in FIG. 9, the pulse driving unit 215 outputs the modulation signal to the signal coupling unit 211 (Step S401), and the H-side amplitude detector 212 and the L-side amplitude detector 213 detect VH and VL (Step S402).

The comparing unit 214 then determines whether a ratio between VH and VL is 1:2 (Step S403). When the ratio between VH and VL is 1:2 (YES at Step S404), the comparing unit 214 holds the modulation amplitude (Step S405), and the process proceeds to Step S409.

On the other hand, when the ratio between VH and VL is not 1:2 (NO at Step S404), the comparing unit 214 determines whether the relation between VH and VL satisfies a condition of VH/VL>1/2. When the condition is not satisfied (NO at Step S406), the modulation amplitude is reduced (Step S407), and the process proceeds to Step S409.

On the other hand, when the condition is satisfied (YES at Step S406), the modulation amplitude is increased (Step S408). Thereafter, it is determined whether to end the control. When the control is not ended (NO at Step S409), the process proceeds to Step S401. When the control is ended (YES at Step S409), the modulation amplitude control is ended.

In this way, by controlling the ratio between VH and VL to be constant, it becomes possible to prevent the modulation amplitude of the modulation signal from becoming excessive or insufficient.

As described above, the optical transmitter 200 superposes a low frequency pilot signal on the light output from the light source unit 203 and includes the EA modulator 206 that modulates signal light superposed with the pilot signal according to the input modulation signal. The optical transmitter 200 detects the high-voltage-side maximum value (Vp) of the modulation signal input to the EA modulator 206, the fluctuation width of the high-voltage-side maximum value (VH), and the fluctuation width of the low-voltage-side minimum value (VL). The optical transmitter 200 adjusts the bias potential to be input to the EA modulator 206 based on the high-voltage-side maximum value and the current for bias input to the EA modulator, and adjusts the modulation amplitude of the modulation signal to be input to the EA modulator 206 based on the fluctuation width of the high-voltage-side maximum value (VH) and the fluctuation width of the low-voltage-side minimum value (VL). Thus, even when the extinction characteristic of the EA modulator 206 is fluctuated, it is possible to optimally adjust the bias point and the fluctuating amplitude, thereby suppressing fluctuation of the waveform of the signal light.

Meanwhile, among the respective processes described in the above embodiments, all or a part of the processes explained as being automatically performed may be manually performed, or all or a part of the processes explained as being manually performed may be automatically performed through a known method. In addition, the process procedures, control procedures, specific names, and information including various kinds of data and parameters described in the specification may be arbitrarily changed unless otherwise specified.

Each component of the respective units depicted in the drawings is conceptual in function, and is not necessarily physically configuration as depicted. That is, the specific patterns of distribution and integration of the components are not meant to be restricted to those the depicted in the drawings. All or a part of the components may be functionally or physically distributed or integrated in arbitrary units, according to various kinds of load and the status of use. Furthermore, all or an arbitrary part of processing functions performed in each component may be achieved by a central processing unit (CPU) and a program analyzed and executed on the CPU, or may be achieved as hardware with a wired logic.

According to the present invention, the light from the light source that outputs the light superposed with the pilot signal having a predetermined frequency are modulated according to the input electric signal; the high-output-side maximum value, a fluctuation width of the high-output-side maximum value, and a fluctuation width of a low-output-side minimum value of the modulated signal light are detected; the bias potential of the electric signal are adjusted based on the detected maximum value; and the amplitude of the electric signal to be input to the optical modulating unit is adjusted based on the fluctuation width of the high-output-side maximum value and the fluctuation width of the low-output-side minimum value. Therefore, without using a large-capacity condenser, fluctuation of the waveform of the signal light output from an optical modulating unit can be suppressed even when the extinction characteristic of the optical modulating unit is fluctuated.

According to the present invention, the bias potential of the electric signal to be input to the optical modulating unit is adjusted so that the maximum value output from the optical modulating unit becomes a predetermined value. Therefore, irrespective of fluctuation of the extinction characteristic of the optical modulating unit, the maximum value of the signal light output from the optical modulating unit can be maintained constant.

According to the present invention, the amplitude of the electric signal to be input to the optical modulating unit is adjusted so that the fluctuation width of the high-output-side maximum value and the fluctuation width of the low-output-side minimum value are equal. Therefore, even when the extinction characteristic of the optical modulating unit is fluctuated, fluctuation of the waveform of the signal light can be suppressed.

According to the present invention, the light from the light source that outputs the light superposed with a pilot signal having a predetermined frequency is modulated according to the input electric signal; the high-voltage-side maximum value of the electric signal input to the optical modulating unit, the fluctuation width of the high-voltage-side maximum value, and the fluctuation width of a low-voltage-side minimum value are detected; the bias potential of the electric signal to be input to the optical modulating unit is adjusted based on the high-voltage-side maximum value and the value of the current input to the optical modulating unit; and the amplitude of the electric signal to be input to the optical modulating unit is adjusted based on the fluctuation width of the high-voltage-side maximum value and the fluctuation width of the low-voltage-side minimum value. Therefore, even when the extinction characteristic of the optical modulating unit is fluctuated, fluctuation of the waveform of the signal light output from the optical modulating unit can be suppressed.

According to the present invention, the absorbed current of the optical modulating unit is calculated based on the high-voltage-side maximum value, the value of the current input to the optical modulating unit, and the resistance value of the optical modulating unit; and the bias potential of the electric signal to be input to the optical modulating unit is adjusted so that the calculated absorbed current becomes a predetermined value.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention.

What is claimed is:
1. An optical transmitter comprising:
a light source that outputs light superposed with a pilot signal having a predetermined frequency;
an optical modulating unit that modulates the light from the light source according to an electric signal input thereto;

a detecting unit that detects a high-output-side maximum value of signal light output from the optical modulating unit, a fluctuation width of the high-output-side maximum value, and a fluctuation width of a low-output-side minimum value;

a bias-potential adjusting unit that adjusts a bias potential of an electric signal to be input to the optical modulating unit based on the detected maximum value; and an amplitude adjusting unit that adjusts an amplitude of the electric signal to be input to the optical modulating unit based on the fluctuation width of the high-output-side maximum value and the fluctuation width of the low-output-side minimum value.

2. The optical transmitter according to claim 1, wherein the bias-potential adjusting unit adjusts the bias potential of the electric signal to be input to the optical modulating unit, so that the maximum value detected by the detecting unit becomes a predetermined value.

3. The optical transmitter according to claim 1, wherein the amplitude adjusting unit adjusts the amplitude of the electric signal to be input to the optical modulating unit, so that a ratio between the fluctuation width of the high-output-side maximum value and the fluctuation width of the low-output-side minimum value becomes a predetermined value.

4. An optical transmitter comprising:
a light source that outputs light superposed with a pilot signal having a predetermined frequency;
an optical modulating unit that modulates the light from the light source according to an electric signal input thereto;
a detecting unit that detects a high-voltage-side maximum value of the electric signal input to the optical modulating unit, a fluctuation width of the high-voltage-side maximum value, and a fluctuation width of a low-voltage-side minimum value;
a bias-potential adjusting unit that adjusts a bias potential of the electric signal to be input to the optical modulating unit based on the high-voltage-side maximum value and a value of a current input to the optical modulating unit; and
an amplitude adjusting unit that adjusts an amplitude of the electric signal to be input to the optical modulating unit based on the fluctuation width of the high-voltage-side maximum value and the fluctuation width of the low-voltage-side minimum value.

5. The optical transmitter according to claim 4, wherein based on the high-voltage-side maximum value, the value of the current input to the optical modulating unit, and a resistance value of the optical modulating unit, the bias-potential adjusting unit calculates an absorbed current of the optical modulating unit and adjusts the bias potential of the electric signal to be input to the optical modulating unit, so that the calculated absorbed current becomes a predetermined value.

6. The optical transmitter according to claim 4, wherein the amplitude adjusting unit adjusts the amplitude of the electric signal to be input to the optical modulating unit, so that a ratio between the fluctuation width of the high-voltage-side maximum value and the fluctuation width of the low-voltage-side minimum value becomes a predetermined value.

7. An optical transmitting method of an optical transmitter that transmits signal light modulated according to an input electric signal, the optical transmitter including a light source that outputs light superposed with a pilot signal having a predetermined frequency and an optical modulator that modulates signal light according to the input electric signal, the optical transmitting method comprising:
modulating the light from the light source by the optical modulator;
detecting a high-output-side maximum value of signal light output from the optical modulator, a fluctuation width of the high-output-side maximum value, and a fluctuation width of a low-output-side minimum value;
adjusting a bias potential of an electric signal to be input to the optical modulator based on the maximum value; and
adjusting an amplitude of the electric signal to be input to the optical modulator based on the fluctuation width of the high-output-side maximum value and the fluctuation width of the low-output-side minimum value.

8. The optical transmitting method according to claim 7, wherein at the adjusting of the bias potential, the bias potential of the electric signal to be input to the optical modulating unit is adjusted so that the maximum value detected at the detecting becomes a predetermined value.

9. An optical transmitting method of an optical transmitter that transmits signal light modulated according to an input electric signal, the optical transmitter including a light source that outputs light superposed with a pilot signal having a predetermined frequency and an optical modulator that modulates signal light according to the input electric signal, the optical transmitting method comprising:
modulating the light from the light source by the optical modulator;
detecting a high-voltage-side maximum value of the electric signal input to the optical modulator, a fluctuation width of the high-voltage-side maximum value, and a fluctuation width of a low-voltage-side minimum value;
adjusting a bias potential of the electric signal to be input to the optical modulator based on the high-voltage-side maximum value detected at the detecting and a value of a current input to the optical modulator; and
adjusting an amplitude of the electric signal to be input to the optical modulator based on the fluctuation width of the high-voltage-side maximum value and the fluctuation width of the low-voltage-side minimum value.

10. The optical transmitting method according to claim 9, wherein at the adjusting of the bias potential, based on the high-voltage-side maximum value, the value of the current input to the optical modulating unit, and a resistance value of the optical modulating unit, an absorbed current of the optical modulating unit is calculated, and the bias potential of the electric signal to be input to the optical modulating unit is adjusted so that the calculated absorbed current becomes a predetermined value.

* * * * *